(12) United States Patent  (10) Patent No.: US 9,092,125 B2
Michaelis et al.  (45) Date of Patent: Jul. 28, 2015

(54) MULTI-MODE TOUCHSCREEN USER INTERFACE FOR A MULTI-STATE TOUCHSCREEN DEVICE

(75) Inventors: Paul Roller Michaelis, Loisville, CO (US); David Scott Mohler, Arvada, CO (US); Richard L. Robinson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 423 days.

(21) Appl. No.: 12/756,363

(22) Filed: Apr. 8, 2010

(65) Prior Publication Data

US 2011/0248927 A1 Oct. 13, 2011

(51) Int. Cl.
*G06F 3/041* (2006.01)
*G06F 3/0484* (2013.01)
*G06F 3/0488* (2013.01)

(52) U.S. Cl.
CPC ........ *G06F 3/04845* (2013.01); *G06F 3/04883* (2013.01); *G06F 2203/04806* (2013.01); *G06F 2203/04808* (2013.01)

(58) Field of Classification Search
CPC ............ G06F 2203/04806; G06F 2203/04808; G06F 3/04845; G06F 3/04883
USPC ......................... 345/156, 163, 173–184, 168; 178/18.01–18.09; 315/149, 150
See application file for complete search history.

(56) References Cited

U.S. PATENT DOCUMENTS

| | | |
|---|---|---|
| 5,471,578 A | 11/1995 | Moran et al. |
| 5,500,935 A | 3/1996 | Moran et al. |
| 5,509,114 A | 4/1996 | Moran et al. |
| 5,612,719 A | 3/1997 | Beernink et al. |
| 5,644,628 A | 7/1997 | Schwarzer et al. |
| 5,729,249 A | 3/1998 | Yasutake |
| 5,745,116 A | 4/1998 | Pisutha-Arnond |
| 5,777,605 A * | 7/1998 | Yoshinobu et al. ........... 345/173 |

(Continued)

FOREIGN PATENT DOCUMENTS

| | | |
|---|---|---|
| CN | 201156246 | 11/2008 |
| EP | 2104027 | 9/2009 |

(Continued)

OTHER PUBLICATIONS

Search Report for United Kingdom Patent Application No. GB1105922.7, dated Jul. 29, 2011 3 pages.
"Engineering Windows 7" available at http://blogs.msdn.com/e7/archive/2009/03/25/touching-windows-7.aspx, printed Apr. 7, 2010.

(Continued)

*Primary Examiner* — Kumar Patel
*Assistant Examiner* — Insa Sadio
(74) *Attorney, Agent, or Firm* — Sheridan Ross P.C.

(57) ABSTRACT

A simple exemplary embodiment can leverage the ability of the touchscreen or touchpad device to distinguish between a fingernail and a palm-side fingertip press as binary distinctions. This can be done via long nails or alternatively, by rotating a hand to invert the finger. The binary distinction can be used to perform different functions. For example, a fingertip press could be the functional equivalent of a left-click on a mouse, and a fingernail press could be the equivalent of a right-click. Another example using a simply binary distinction could be that a fingertip press while typing will result in lower case, and fingernail press while typing will result in upper case. Another example, using a binary distinction, would interpret a light touch for right-clicks or upper case characters and a heavy touch for left-clicks or lower case characters.

16 Claims, 4 Drawing Sheets (56) References Cited

U.S. PATENT DOCUMENTS

| | | | |
|---|---|---|---|
| 5,809,267 A | 9/1998 | Moran et al. | |
| 5,880,411 A | 3/1999 | Gillespie et al. | |
| 6,163,313 A | 12/2000 | Aroyan et al. | |
| 6,396,523 B1 | 5/2002 | Segal et al. | |
| 6,610,936 B2 | 8/2003 | Gillespie et al. | |
| 6,639,584 B1 | 10/2003 | Li | |
| 6,765,557 B1 | 7/2004 | Segal et al. | |
| 7,190,356 B2 | 3/2007 | Lin et al. | |
| 2005/0041885 A1* | 2/2005 | Russo | 382/289 |
| 2005/0134561 A1* | 6/2005 | Tierling et al. | 345/156 |
| 2005/0248539 A1 | 11/2005 | Morrison et al. | |
| 2006/0284858 A1* | 12/2006 | Rekimoto | 345/173 |
| 2008/0158170 A1* | 7/2008 | Herz et al. | 345/173 |
| 2008/0316183 A1 | 12/2008 | Westerman et al. | |
| 2008/0317292 A1 | 12/2008 | Baker et al. | |
| 2009/0125811 A1 | 5/2009 | Bethurum | |
| 2009/0231282 A1* | 9/2009 | Fyke | 345/169 |
| 2009/0309847 A1* | 12/2009 | Russell et al. | 345/173 |
| 2010/0044121 A1* | 2/2010 | Simon et al. | 178/18.03 |
| 2011/0248946 A1 | 10/2011 | Michaelis et al. | |

FOREIGN PATENT DOCUMENTS

| | | |
|---|---|---|
| EP | 2249240 | 11/2010 |
| EP | 2270641 | 1/2011 |
| JP | H11-293606 | 10/1999 |
| JP | 2000-120087 | 4/2000 |
| KR | 20080066797 | 7/2008 |
| KR | 2009-0070491 | 7/2009 |
| WO | WO 2009/084809 | 7/2009 |

OTHER PUBLICATIONS

Cassinelli, Alvaro et al. "Smart Laser Scanner for Human-Computer Interface" available at http://www.k2.t.u-tokyo.ac.jp/fusion/LaserActivityTracking/, printed Apr. 7, 2010.

White, Charlie, "Gizmodo: Apple's Gesture Dictionary, A Fingering Chart for Multi-Touch" available at http://gizmodo.com/285176/apples-gesture-dictionary-a-fingering-chart-for-multi+touch, printed Apr. 7, 2010.

Grover, Doug "Detection of a Rolling Motion or Sliding Motion of a Body Part on a Surface" U.S. Appl. No. 12/689,493, filed Jan. 19, 2010.

Grover, Doug "Event Generation Based on Print Portion Identification" U.S. Appl. No. 12/689,567, filed Jan. 19, 2010.

Official Action with English Translation for Korea Patent Application No. 2011-0032861, dated Sep. 25, 2013 7 pages.

Official Action with English Translation for Korea Patent Application No. 2011-0032861, dated Apr. 23, 2014 8 pages.

Official Action with English Translation for German Patent Application No. 102011016389.1, dated Jun. 30, 2014 7 pages.

Official Action for United Kingdom Patent Application No. GB1105922.7, dated Aug. 15, 2014 4 pages.

Official Action with English Translation for Korea Patent Application No. 2011-0032861, dated Nov. 17, 2014 11 pages.

Official Action (with English translation) for Chinese Patent Application No. 201110090153.6, dated Jan. 22, 2015, 17 pages.

Official Action for United Kingdom Patent Application No. GB1105922.7, dated Feb. 18, 2015 3 pages.

Notice of Allowance (with English translation) for Korea Patent Application No. 2011-0032861, dated Jan. 14, 2015 3 pages.

* cited by examiner

| Characteristic | Characteristic | Function | Hybrid |
| --- | --- | --- | --- |
| 1 | Rotate Right | Rotate Interface Right | |
| 2 | Rotate Left | Rotate Interface Left | |
| 3 | Nail | Select | |
| 4 | Tip + Nail | Shift + F'n | |
| 5 | Roll Forward | Zoom | |
| 6 | Additional Roll Forward | Zoom + Adjust Granularity | |
| 7 | Additional Roll Forward | Zoom + Further Adjust Granularity | 3+7 = Zoom + Select |
| 8 | Nail Tap | Hold | |
| 9 | Nail Double Tap | Insert Text | 3+9 = Insert + Enter |

Fig. 4

MULTI-MODE TOUCHSCREEN USER INTERFACE FOR A MULTI-STATE TOUCHSCREEN DEVICE

RELATED APPLICATION DATA

This application is related to:

U.S. application Ser. No. 12/689,493, filed Jan. 19, 2010, entitled "Detection of a Rolling Motion or Sliding Motion of a Body Part on a Surface,"

U.S. application Ser. No. 12/689,567, filed Jan. 19, 2010, entitled "Event Generation Based on Print Portion Identification,"

U.S. application Ser. No. 12/756,375, filed Apr. 8, 2010, entitled "Multi-Mode Prosthetic Device To Facilitate Multi-State Touch Screen Detection," all of which are incorporated herein by reference in their entirety.

FIELD

One exemplary aspect is directed toward input devices. Even more particularly, an exemplary aspect is directed toward a touchscreen user interface with multiple modes.

BACKGROUND

A touchpad, which is also known as a track pad, is an input device that includes a special surface that is capable of translating the motion and position of a user's finger to a relative position on, for example, a screen. Touchpads are becoming even more abundant on laptop computers, and also can be used as a substitute for a computer mouse when, for example, there is limited space. Touchpads vary in size but are rarely made larger than 40 square cm with their size generally being proportional to the device which with they are associated. They can also be found on personal digital assistants (PDAs), portable media players, laptops, netbooks, and the like.

In general, touchpads operate either based on capacitive sensing and/or conductance sensing. The most common technology used entails sensing the capacitance of a finger, or the capacitance between sensors. Because of the property being sensed, capacitance-based touchpads will not sense the tip of a pencil or other similar implement. Gloved fingers will generally also be problematic, and may cause problems when a user is trying to operate the device.

Touchpads, similar to touchscreens, by their design, are able to sense absolute positions, with precision being limited by their size. For common use as a pointing device, the dragging motion of a finger is translated into a finer, relative motion of the cursor on the screen, and analogous to the handling of a mouse that is lifted and put back on a surface. Buttons comparable to those present on a mouse are typically below, above, or beside the touchpad with a button serving in a similar manner to that as the buttons on a mouse. Depending on the model of the touchpad and drivers behind it, you may also be able to click by tapping your finger on the touchpad and a drag with tap followed by a continuous pointing motion (a click and a half). Touchpad drivers can also allow the use of multiple fingers to facilitate functionality corresponding to the other mouse buttons, commonly a two-finger tapping is correlatable to the center button of a mouse.

Some touchpads also have "hot spots" which are locations on the touchpad that indicate user intentions other than pointing. For example, on certain touchpads, moving the finger along an edge of the touchpad will act as a scroll wheel, controlling the scroll bar and scrolling the window that has the focus vertically or horizontally depending on which edge is stroked. Some companies use two-finger dragging gestures for scrolling on their track pads, with these typically being driver dependent functions that can be enabled or disabled by a user. Some touchpads also include tap zones which are regions whereby a tap will execute a predetermined function. For example, the function could be pausing of the media player or launching of an application.

There are two principal technologies that are used in touchpads. In a matrix approach, a series of conductors are arranged in an array of parallel lines into layers, separated by an insulator and crossing each other at right angles to form a grid. A high frequency signal is applied sequentially between pairs in this two-dimensional grid array. The current that passes between the nodes is proportional to the capacitance. When a virtual ground, such as a finger, is placed over one of the intersections between the conductive layer, some of the electric field is shunted to this virtual ground point, resulting in a change in the apparent capacitance at this location.

In the capacitive shunt method, the pad senses the changing capacitance between a transmitter and a receiver that are on opposite sides of the sensor. The transmitter creates an electric field which osculates typically between 200 and 300 khz. If a ground point, such as finger, is placed between the transmitter and receiver, some of the field lines are shunted away, thereby decreasing the apparent capacitance. These changes in capacitance are then used as input from the device.

There are also touchpads that have advanced functionality, such as letting users scroll in an arbitrary direction by touching the pad with two fingers instead of one, and then moving their fingers across the pad in the direction they wish to scroll. Other enhanced functionality includes the ability to allow users to do various combinations of gestures, such as swiping four fingers up or down to activate a particular application.

A touchscreen is an electronic visual display that can detect the presence and location of a touch within the display area. The term generally refers to touch or contact to the display of the device by a finger, fingers, or a hand. Touchscreens can also sense other passive objects, such as a pen. In general, any screen that allows a user to interact physically with what is shown on the display, via direct manipulation, is typically categorized as a touchscreen.

Touchscreens typically have two main attributes. The first is that the touchscreen enables one to interact with what is displayed directly on the screen, where it is displayed, rather than indirectly with a mouse or a touchpad. Secondly, a touchscreen allows a user to interact with the display without requiring any intermediate device, again, such as a stylus, mouse, or the like, that would usually be held in the hand. These devices are often seen in tablet PCs, and are also prominent in many digital appliances such as PDAs, satellite navigation devices, mobile phones, mobile entertainment devices, video games, and the like.

There are a number of technologies that support various touchscreens, such as resistive technologies, surface acoustic wave technologies, capacitive technologies, surface capacitance technologies, projected capacitance technologies, strain gauge technologies, optical imaging technologies, dispersive signal technologies, acoustic pulse recognition technologies, and coded LCD (bi-directional screen) technologies.

SUMMARY

One exemplary aspect is directed toward improved functionality associated with one or more of a touchscreen, touchpad, or track pad, that incorporates natural, convenient and easy to use and understand metaphors of modalities to support new, denser, more elaborate and abstract functionality.

Touchscreen, touchpad, and track pad devices (and their underlying technologies as outlined above) are known, however an exemplary embodiment is directed toward an improved version of these interfaces that provides multi-state detection capabilities to detect multiple states of touch, such as distinguishing a fingernail from a palm-side fingertip.

The techniques disclosed herein can also be extended to a prosthetic that not only simulates a finger, but also introduces new touch presence and gesture modalities with the accompanying attributes that are not possible or as natural in the prior art. For example, the user interface functionality can vary with the mode selected for the prosthetic.

Another exemplary embodiment not only provides a simple and flexible new type of interface for input devices, such as touchscreens and touchpads, but also allows simpler and more natural gestures than those required as described above.

A simple exemplary embodiment of this user interface can leverage the ability of the touchscreen or touchpad device to distinguish between a fingernail and a palm-side fingertip press as binary distinctions. This can be done via long nails or alternatively, by rotating a hand to invert the finger. The binary distinction can be used to perform different functions. For example, a fingertip press could be the functional equivalent of a left-click on a mouse, and a fingernail press could be the equivalent of a right-click. Another example using a simply binary distinction could be that a fingertip press while typing will result in lower case, and fingernail press while typing will result in upper case. Another example, using a binary distinction, would interpret a light touch for right-clicks or upper case characters and a heavy touch for left-clicks or lower case characters.

In another exemplary embodiment, finger rotation from tip to nail or nail to tip could signal a display to "go to the next page" or "go to the previous page," respectively—or other binary distinctions.

More powerful exemplary embodiments of the user interface could replace currently complex, unnatural and difficult to remember gestures with simpler and more natural ones not possible in the current art. For example, twirling the finger from palm to nail in various orientation and speeds could obtain comparable pitch, role, and yaw rotations of an object being displayed. Similar, but even simpler gestures that always return the finger to the same position without having to change the orientation may be envisioned by those schooled in the art.

This exemplary user interface could be used by those with, for example, Amyotrophic Lateral Sclerosis (ALS). ALS is a form of motion neuron disease most famously associated with Steven Hawking and Lou Gehrig. ALS is caused by the degeneration of the motor neurons that control voluntary muscle movement. Steven Hawking still retains the ability to move one of his fingers (this is how he controls his computer), but he has no ability to move his arm. Leveraging these related ideas would allow his finger to change modes which could be very helpful to him and others like him.

In another exemplary embodiment, the user interface could provide an accompanying feedback display of the finger or the prosthetic as an aid to the user. The display could accurately display the finger or could be enhanced or virtualized with colors to signify boundaries, speed, acceleration, jerk (the rate of change of acceleration), or use other means to aid the user that are known to those schooled in the art of human factors, or the like.

In accordance with one exemplary embodiment, the new flexibility afforded by the new input device allows the user interface to incorporate much more powerful spatial modes to associate and correlate multiple objects in arbitrary aggregations to aid rapid development, create flexible extensions, and quickly support new an novel modalities, functionality, and attributes not yet envisioned.

Another exemplary embodiment leverages more accurate distinctions between a fingertip, fingernail, stylus, or the newly proposed prosthetic device to assist with providing new modes, states, and functionality. Additionally, using the aforementioned optional prosthetic device that both stimulates a normal finger and provides new extended capabilities and/or modes of operation, an exemplary embodiment supports additional new functionality related thereto.

Another exemplary embodiment leverages more accurate distinctions between a fingertip, fingernail, stylus, or the newly proposed prosthetic device to assist with providing new modes, states, and functionality based on an assessment of the electrical/capacitive/inductive "signature" associated with the input. Additionally, using the aforementioned optional prosthetic device that both stimulates a normal finger and provides new extended capabilities and/or modes of operation, an exemplary embodiment supports additional new functionality related thereto.

An additional exemplary embodiment provides an unprecedented multi-state touchscreen that provides new and extensible chest related functionality to both support the prior art and extended in ways not yet envisioned by leveraging multi-state touchscreen device that distinguishes among the presence of a fingernail, fingertip, stylus, or a specially compatible (but optional) multi-mode prosthetic device.

Another exemplary embodiment is directed toward a prosthetic with a fingernail that supports the techniques described herein.

Another exemplary embodiment is directed toward detection of a transition and mapping that transition to corresponding functionality(ies), the transition being one or more of:
- a rotation or degree of rotation about an axis;
- a point-of-contact staying at a same X/Y coordinate while a finger(s) rotates; and
- a point-of-contact shifting to a different X/Y coordinate while a finger(s) rotates.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any non-transitory, tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, this disclosure is considered to include a tangible storage medium or distribution medium and prior art-recognized equivalents and successor media, in which the software implementations of the present embodiments are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, it should be appreciated that individual aspects of the embodiments can be separately claimed.

The preceding is a simplified summary of the embodiments to provide an understanding of some aspects of thereof. This summary is neither an extensive nor exhaustive overview of the various embodiments. It is intended neither to identify key or critical elements of the embodiments nor to delineate the scope of the embodiments but to present selected concepts of the embodiments in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The exemplary embodiments disclosed herein will be discussed with relation to the figures wherein.

DETAIL DESCRIPTION

The techniques will be illustrated below in conjunction with an exemplary electronic system. Although well suited for use with, e.g., a system using a computer/electronic device, server(s), communications devices, and/or database(s), the embodiments are not limited to use with any particular type of electronic device(s) or system or configuration of system elements. Those skilled in the art will recognize that the disclosed techniques may be used in any application in which it is desirable to provide enhanced input capabilities.

The exemplary systems and methods will also be described in relation to software (such as drivers), modules, and associated hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the embodiments. It should be appreciated, however, that the techniques disclosed herein may be practiced in a variety of ways beyond the specific details set forth herein.

Figure 1:
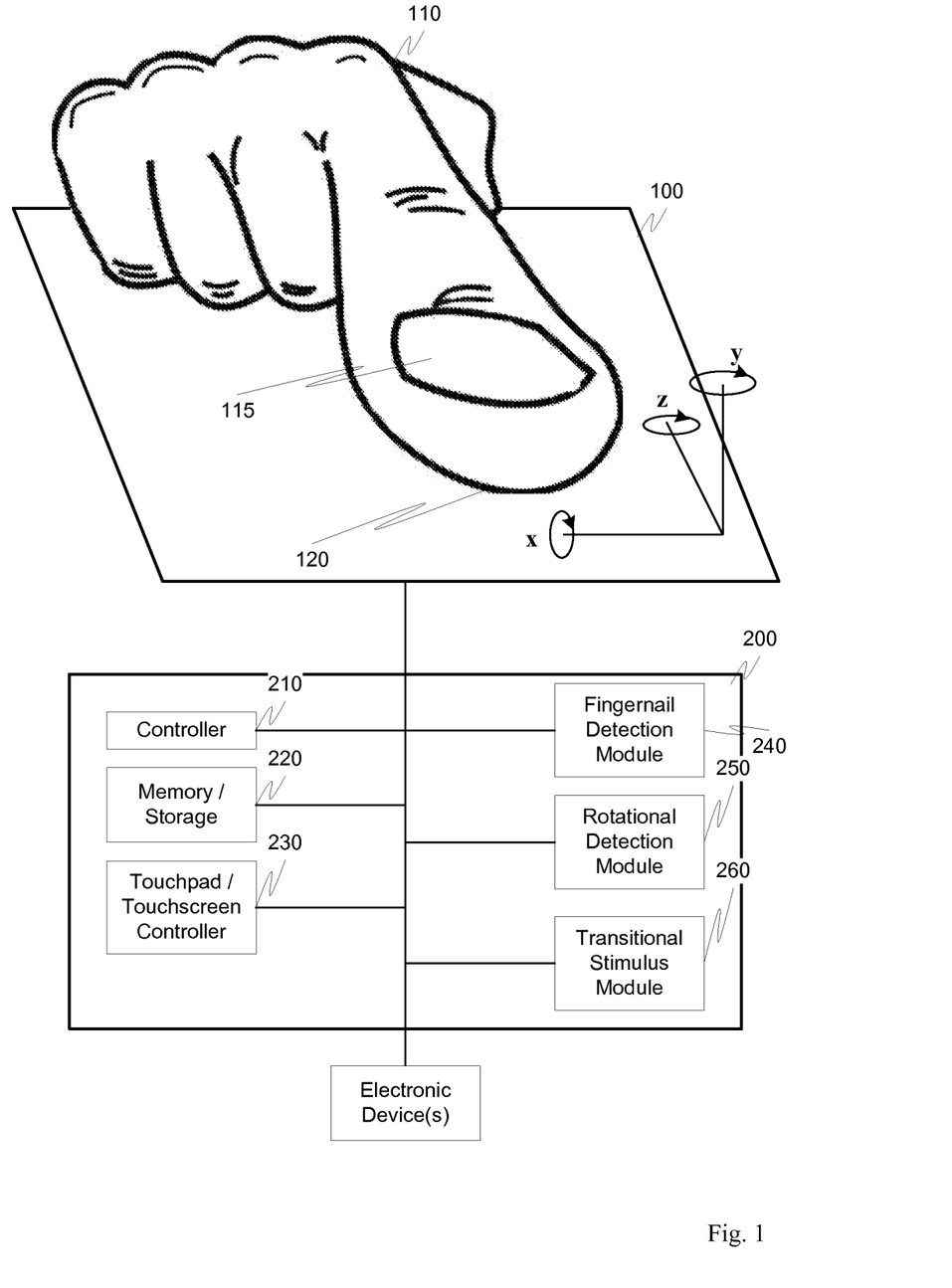
FIG. 1 is a block diagram illustrating an exemplary user interface.

FIG. 1 illustrates an exemplary embodiment of an input device 200. While the embodiments discussed hereinafter will be directed toward a touchpad type of device, it is to be appreciated that the functionality disclosed herein can also be extended to touchscreens, track pads, and related input devices. Moreover, hybrid devices, such as a mouse that includes a touchpad, can also utilize one or more of the techniques disclosed herein.

The exemplary embodiment of FIG. 1 includes a touchpad 100, connected to a controller 210, memory 220, touchpads/touchscreen controller 230, fingernail detection module 240, rotational detection module 250, and transitional stimulus module 260. For ease of illustration, all known and conventional components have been omitted for the sake of clarity, but it is to be appreciated that this input device as depicted in FIG. 1 can be associated with, for example, a personal computer, PDA, gaming device, mobile electronics device, laptop, netbook, media player, point of sale equipment, and in general with any electronics device.

As discussed, exemplary embodiments are directed toward increased functionality associated with detection of a finger, or portion thereof, or prosthetic input device, and associated actions. For example, in FIG. 1 finger 110, includes a finger portion 120, such as a fingerprint and/or fingertip, and a fingernail 115. One or more of the fingernail 115 and finger portion 120 contact the touchpad 100 to control and/or enter input into an electronic device. In addition to being able to move the finger 110 in the traditional X and Y direction on the touchpad 100, and in accordance with an exemplary embodiment, the finger 110 can "rotate forward" about the X-axis thereby bringing the fingertip, and as the finger 110 continues to roll forward, the fingernail 115 into contact with the touchpad 100. As will be discussed in greater detail, certain functionality can be associated this particular pattern or movement, that functionality having an effect on the operation of the electronic device.

Furthermore, and as will be discussed in greater detail hereinafter, the finger 110 can rotate about the Y axis, the Z axis, and/or the X axis, all of which movements can also have corresponding functionality. Additionally, combinations of X, Y and Z motion may also have meanings similar to what they have with a joystick beyond discrete X, Y and Z motions, wherein the finger is used as a virtual joystick. Additionally, in another operational mode, a distinction can be made between a finger rotation in which the point-of-contact on the touchscreen/touch pad doesn't change (with our without the finger contact portion changing)—i.e., the point-of-contact stays at the same X/Y coordinate while the finger rotates— and the case in which the point-of-contact shifts during the finger rotation. These different interactions could similarly me mapped to corresponding functionality.

Figure 2A:
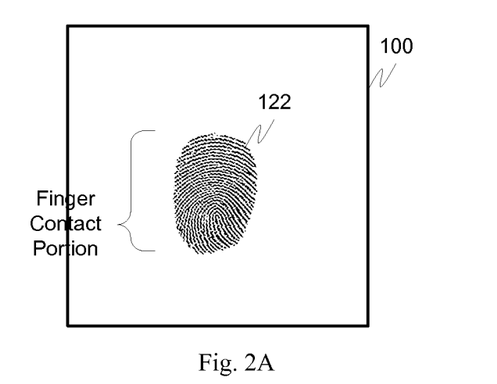
FIGS. 2A-2F illustrate the exemplary finger positions.
Figure 2B:
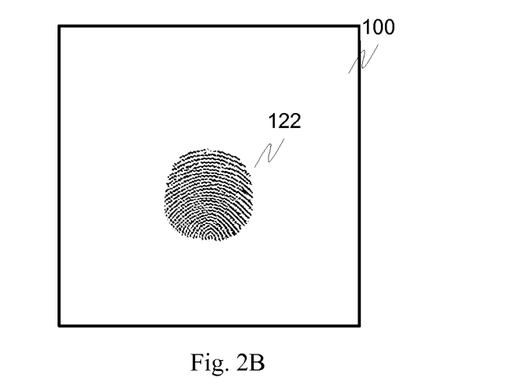
Figure 2C:
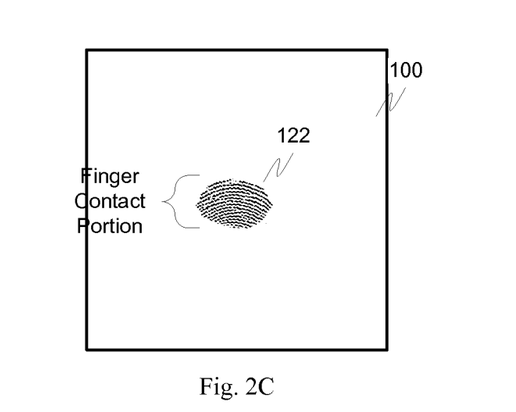
Figure 2D:
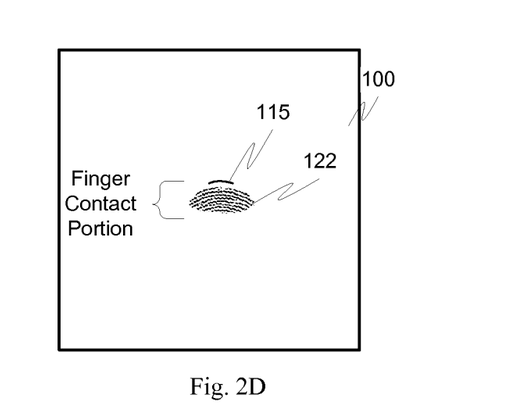
Figure 2E:
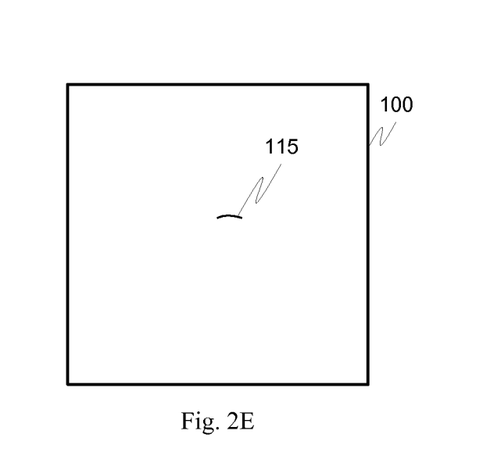

The relative motion of finger 110 will be described in relation to FIGS. 2A-F. For example, as illustrated in FIG. 2A, when the finger 110 comes in contact with the touchpad 100, there is a finger contact portion 122, where a portion of the finger comes into contact with the touchpad. Associated with this contact there is a corresponding capacitive inductive, resistive, or optical change, based on the type of input device being used, which is detectable and, with the cooperation of the touchpad controller 230, is translated into a corresponding action on the electronic device. FIGS. 2B-2E illustrate a transition from a larger portion of the finger being in contact with the touchpad as illustrated in FIG. 2A through only a fingernail being in contact with the touchpad as illustrated in FIG. 2E. More specifically, in FIG. 2B, the finger is being rotated about the X axis and, as this rotation occurs, a smaller finger contact portion 122 is in contact with the touchpad 100. In cooperation with the transition stimulus module 260, and the touchpad controller 230, this decrease in the area of the finger contact portion is detectable and can be correlated to a particular function of the electronic device. In accordance with this exemplary embodiment, as the finger is rolled about the X axis, there is an increase in granularity of the input, which can optionally be coupled with a zoom function. As the finger rotates further about the X axis, as illustrated in FIGS. 2C and 2D, there is a corresponding greater increase in granularity with, in FIG. 2D, it being detectable by the transition stimulus module 260 and the fingernail detection module 240, that the fingernail 115 has also come into contact with the touchpad 100. As the finger continues to rotate even further about the X axis, FIG. 2E illustrates where only the fingernail 115 is in contact with the touchpad 100, and detectable by the fingernail detection module 240. Appreciating that the area in contact with the touchpad 100 as well as the material in contact with the touchpad 100 (skin verse keratin) have different detectable electrical properties, there is a going to be a corresponding change in the electrical/optical characteristics associated with the touchpad 100. Again, this change is detectable by one or more of the fingernail detection module 240, and transition stimulus module 260, the change being correlateable to a particular type of input(s) that, in cooperation with the touchpad controller 230, translates into a corresponding function to be performed on the electronic device.

Figure 2F:
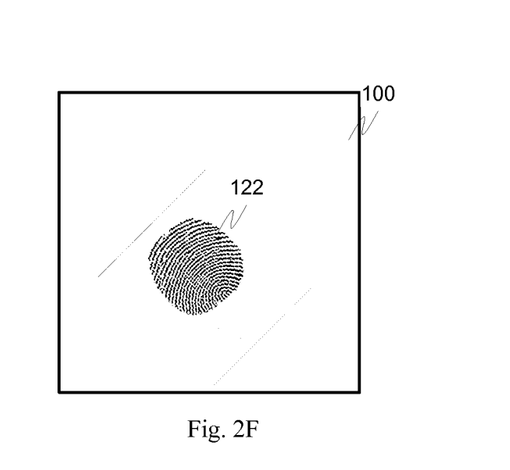

FIG. 2F illustrates an exemplary embodiment where the rotation of the finger 120 is detected on the touchpad 100. More specifically, and in cooperation with the rotation detection module 250, the rotation of the finger 110 about the Y axis is detectable, and similar to the above embodiments, correlatable to a particular function that corresponds to a particular input with the cooperation of the touchpad controller 230. As will be appreciated, the above functionality can be extended to multiple fingers, with multiple fingernails, and also to, as discussed above, a prosthetic device that may include, for example, an artificial fingernail and/or may be configured such that when certain areas come in contact with the touchpad (the certain area being a different material and therefore simulating a change from skin to fingernail), a corresponding functionality is triggered. For example, the prosthetic device may have multiple tips, each of a different area and/or material, the different areas and/or materials being detectable by the touchpad, and thus allowing similar functionality comparable to when fingernail 115 is detected.

Moreover, it is to be appreciated that the combinations of inputs can be received via the touchpad 100, and these combinations correlateable to a specific function. For example, and as illustrated in FIG. 2D, the fingertip 120 and fingernail 115 are both in contact with the touchpad 100. This particular combination could be correlated to a specific input, such as a hard return.

As will be discussed in greater detail hereinafter, examples are provided of the various types of inputs that could be correlated to the various detections on the touchpad 100. However, and in general, and based on a corresponding device driver, a user can configure, assign, and reassign, or edit which one or more functions they would like assigned to a corresponding action or position of the finger (or prosthetic) on the touchpad 100.

Figure 3:
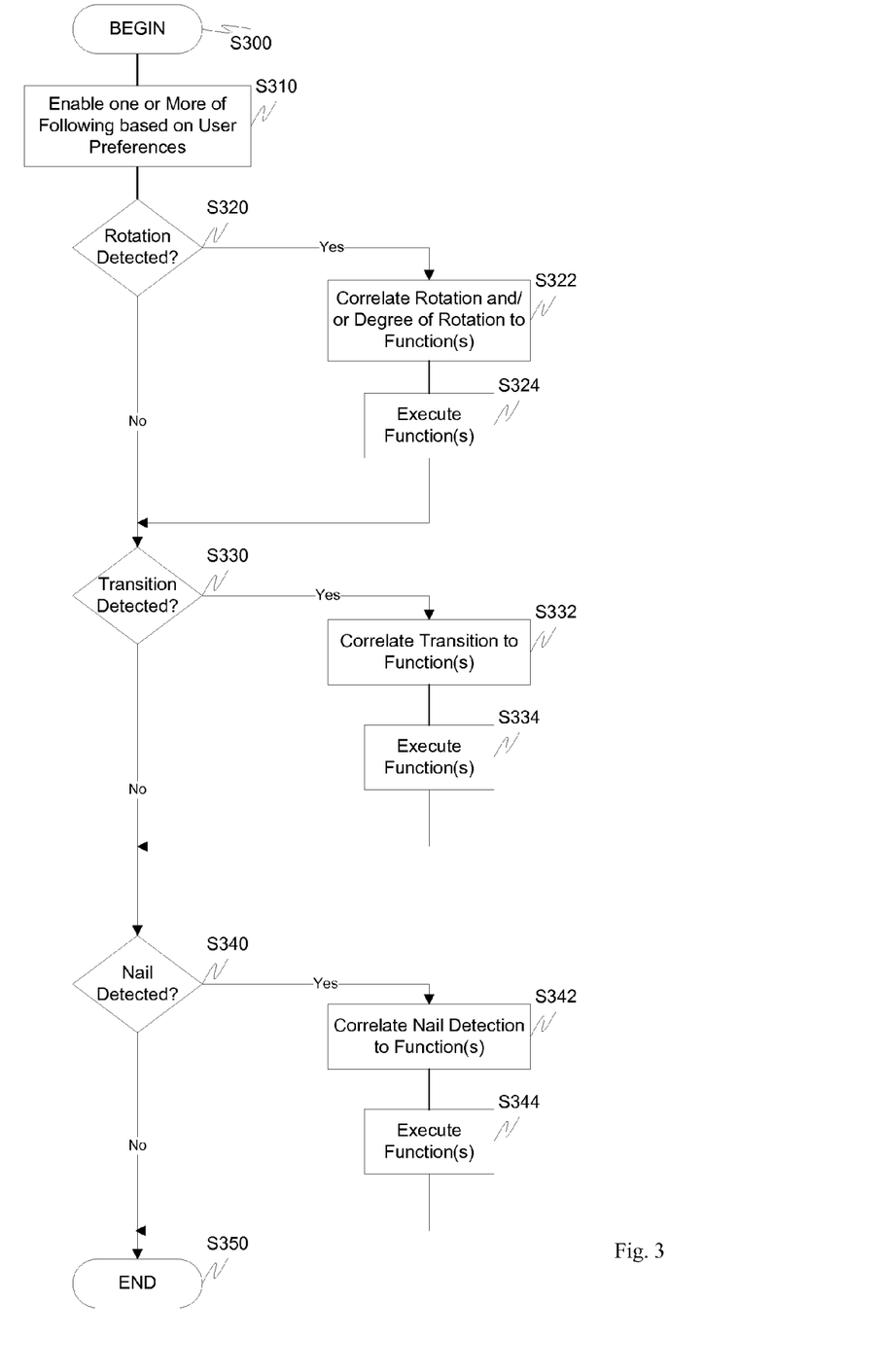
FIG. 3 is a flowchart outlining an exemplary method for operating a user interface.

FIG. 3 outlines an exemplary method of operation of an input device, such as a touchpad, touchscreen, or the like, according to an exemplary embodiment. In particular, control begins in step S300 and continues to step S310. In step S310, one or more detections can be enabled, such as via a device driver, optionally based on user preferences. Next, in step S320, a determination is made whether rotation, about the Y axis, has been detected. While an exemplary embodiment is discussed in relation to rotation about the Y axis, it should be appreciated that a rolling, or rotation about the Z axis, can be detected in a similar manner. If this rotation is detected, control continues to step S322 with control otherwise jumping to step S330.

Additionally, in accordance with another exemplary embodiment, the detection of rotation is mapped to corresponding functionality(ies), where the transition is one or more of:
 a rotation or degree of rotation of a finger(s)/prosthetic about an axis;
 a point-of-contact staying at a same X/Y coordinate while a finger(s)/prosthetic rotates; and
 a point-of-contact shifting to different X/Y coordinates while a finger(s)/prosthetic rotates.

In step S322, the rotation and/or degree of rotation is correlated to a corresponding function(s). For example, if the finger is rotated about the Y axis a quarter turn, a certain function can be executed in step S324, with if the finger was rotated a half turn about the Y axis, another function being executed in step S324. This function could be a specific function on the electronic device or it could simple correspond to a change in position of the input device, or both. Moreover, and as previously discussed, this technique can be extended to the detection of rotation of a plurality of fingers that are in contact with the touchpad/touchscreen 100 with that movement being correlated to a particular function(s). Control then continues to step S330.

In step S330, a determination is made whether a transition has been detected. If a transition has been detected, control continues to step S332 with control otherwise jumping to step S340. In step S332, the detected transition, for example from a large finger contact portion to a smaller finger contact portion, from a finger contact portion to a finger contact portion plus fingernail, or in general any transition that changes the electrical/optical characteristics detected by the touchpad 100 can be correlated to one or more functions, with those functions being performed or executed in step S334. Control then continues to step S340.

In step S340, a determination is made whether a fingernail(s) has been detected. If a fingernail(s) has been detected, control continues to step S342 with control otherwise jumping to step S350 where the control sequence ends.

In step S342, the detection of the nail(s) is correlated to one or more functions which are then executed, in step S344. Control then continues to step S350 where the control sequence ends.

While the above sequence has been described in relation to sequential steps, it should be appreciated that various steps can be combined and mapped to corresponding functionality (ies) and/or performed in a different order.

Figure 4:
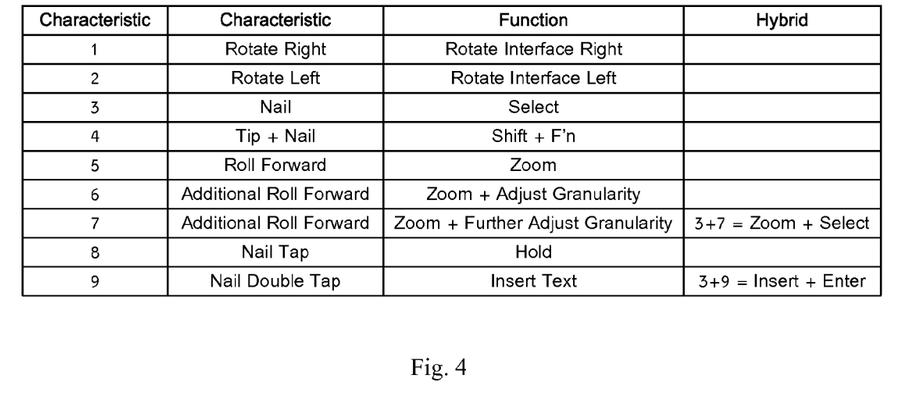
FIG. 4 is a table outlining various functionality associated with various detected input characteristics.

FIG. 4 is a table outlining an exemplary function(s) that can be correlated to certain characteristics associated with the placement of a finger (or prosthetic) being in contact with a touchpad, touchscreen, or comparable input device. For example, the table illustrated in FIG. 4, there are 9 characteristics that have arbitrarily been assigned a corresponding function. Moreover, is illustrated that combinations of these characteristics can result in a hybrid function, such as when a nail is detected in combination with the rolling forward (about the X axis) of the finger, with results in a zooming function, plus a selecting function, upon the nail coming into contact with touchpad. In a similar manner, when characteristics 3 and 9 are combined, the result is an insert, or paste function, combined with an "enter" or click command.

As can be appreciated by one skilled in the art, although specific methods and techniques have been described for using detected input of contact portions of a finger/prosthetic on a touchscreen, touch pad, or the like, other known pattern recognition methods can be employed to determine inputs.

While the above-described flowchart has been discussed in relation to a particular sequence of events, it should be appreciated that changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided systems, apparatuses and methods for detecting input(s) to an electronic device. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. An input method for an electronic device comprising:
   detecting an input from an input device;
   determining an occurrence of a transition from a first contact portion of a first finger to a second, different, contact portion of the first finger, at the input device, wherein the transition includes a transition from a finger contact portion comprising a first one of a fingernail or a fingertip to a second contact portion comprising a second one of a fingernail or a fingertip, wherein determining the transition to the fingernail is based a different detectable electrical characteristic of the fingernail touching the input device and wherein the transition between the fingertip of the user and the fingernail of the user correlates to at least three different corresponding functions comprising:
   a first function based only on the fingertip of the user being in contact with the input device;
   a second function based only on the fingertip of the user and the fingernail of the user being in contact with the input device; and
   a third function based on only the fingernail of the user being in contact with the input device, wherein the first function, the second function, and the third function are different functions; and
   correlating the transition, by utilizing a mapping technique, to a corresponding function.

2. The method of claim 1, wherein the input device is a touchscreen, a touchpad, a track pad or a device that detects a presence and a location of a touch within an area.

3. The method of claim 1, wherein the transition is from a fingertip to a fingernail.

4. The method of claim 1, wherein during the transition contact between the input device and at least one of the fingertip and the fingernail of a user is maintained.

5. The method of claim 1, wherein the transition further includes one or more of:
   a rotation or degree of rotation about an axis;
   a point-of-contact stays at a same X/Y coordinate while one or more fingers rotate; and
   the point-of-contact shifts to a different X/Y coordinate while one or more fingers rotate.

6. One or more means for performing the functionality of claim 1.

7. A non-transitory computer-readable storage media, having instructions stored thereon, that when executed cause the steps of claim 1 to be performed.

8. The method of claim 1, wherein the transition from the first contact portion of the first finger to the second, different, contact portion is a rolling motion from the fingertip to the fingernail and wherein a hybrid function is generated when the fingernail comes in contact with the input device.

9. The method of claim 8, wherein the hybrid function is a selection function and a zooming function.

10. The method of claim 1, wherein during the transition a determined X/Y coordinate of a point of contact does not change.

11. An input device for an electronic system comprising:
- a detection module that detects an input from an input device;
- a transition stimulus module that determines an input from the input device that includes a transition from a first contact portion of a first finger to a second, different, contact portion of the first finger, wherein the transition includes a transition between a fingertip of a user and a fingernail of the user while the user maintains contact with the input device, wherein determining the transition to the fingernail is based on a different detectable electrical characteristic of the fingernail touching the input device and wherein the transition between the fingertip of the user and the fingernail of the user correlates to at least three different corresponding functions comprising:
  - a first function based only on the fingertip of the user being in contact with the input device;
  - a second function based only on the fingertip of the user and the fingernail of the user being in contact with the input device; and
  - a third function based on only the fingernail of the user being in contact with the input device, wherein the first function, the second function, and the third function are different functions; and
- a controller that correlates the transition, by utilizing a mapping technique, to a corresponding function.

12. The device of claim 11, wherein the input device is a touchscreen, a touchpad, a track pad or a device that detects a presence and a location of a touch within an area.

13. The device of claim 11, wherein the transition includes one or more of:
- a rotation or degree of rotation about an axis;
- a point-of-contact stays at a same X/Y coordinate while one or more fingers rotate; and
- the point-of-contact shifts to a different X/Y coordinate while one or more fingers rotate.

14. The device of claim 11, wherein during the transition a determined X/Y coordinate of a point of contact does not change.

15. The device of claim 11, wherein the electronic system is a personal computer, a PDA, a gaming device, a mobile electronics device, a laptop, a netbook, a media player or point of sale equipment.

16. The device of claim 11, wherein the detection module detects different tips of a prosthetic device based on different electrical characteristics of the different tips of the prosthetic device touching the input device.

\* \* \* \* \*